W. O. UMSTEAD.
Hand-Carriage.

No. 160,487.

Patented March 2, 1875.

3 Sheets--Sheet 2.

WITNESSES
Colborne Brookes
Chas Hooch

INVENTOR
William O. Umstead

By
per R S & A P Lacey, Attorney

THE GRAPHIC CO.PHOTO-LITH.39 & 41 PARK PLACE,N.Y.

W. O. UMSTEAD.
Hand-Carriage.
No. 160,487. Patented March 2, 1875.
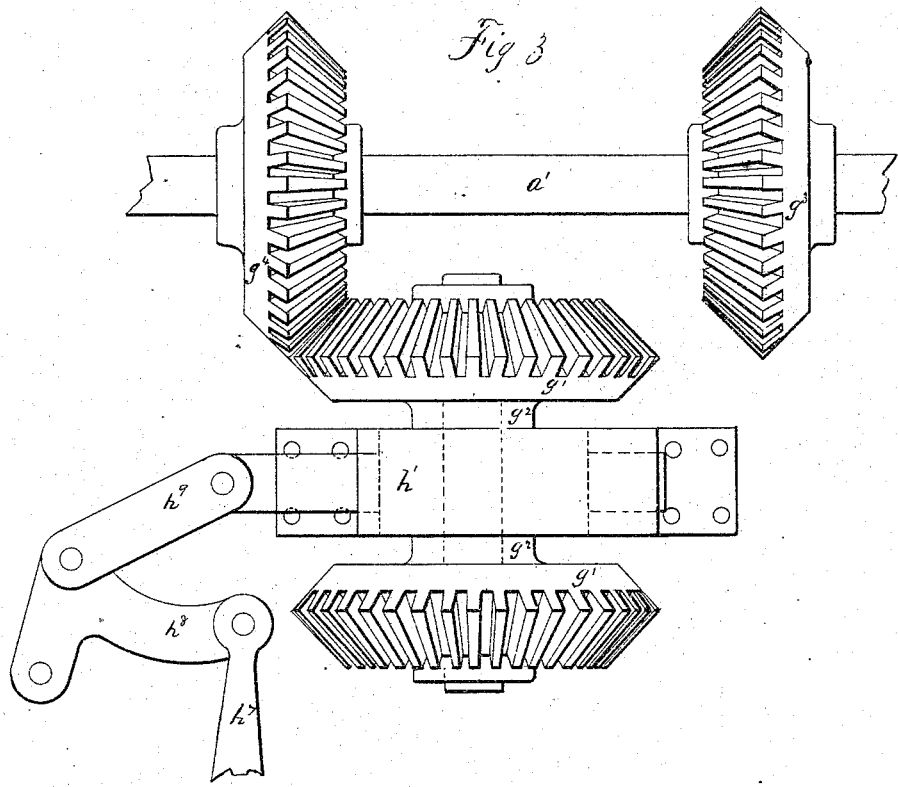
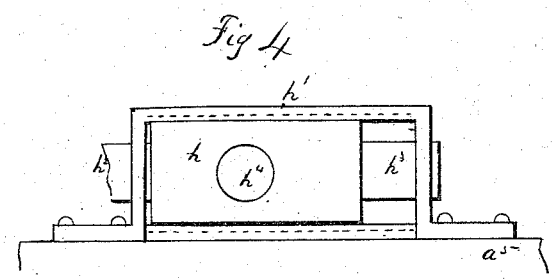

UNITED STATES PATENT OFFICE.

WILLIAM O. UMSTEAD, OF ST. CLAIRSVILLE, OHIO, ASSIGNOR OF ONE-THIRD HIS RIGHT TO JOHN F. BALDWIN, OF SAME PLACE.

IMPROVEMENT IN HAND-CARRIAGES.

Specification forming part of Letters Patent No. 160,487, dated March 2, 1875; application filed July 22, 1874.

*To all whom it may concern:*

Be it known that I, WILLIAM O. UMSTEAD, of Saint Clairsville, in the county of Belmont and State of Ohio, have invented certain new and useful Improvements in Hand-Carriages; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention has for its object to furnish a hand-carriage to be propelled by a spring which may be wound up or tightened by a clutch or other equivalent device, either while the carriage is at rest or in motion, and which may be used as a means of quick and cheap travel, or for the purposes of conveying packages from one point to another; and it consists in the construction and combination of the various parts of the machine, as hereinafter more fully described.

Figure 1:
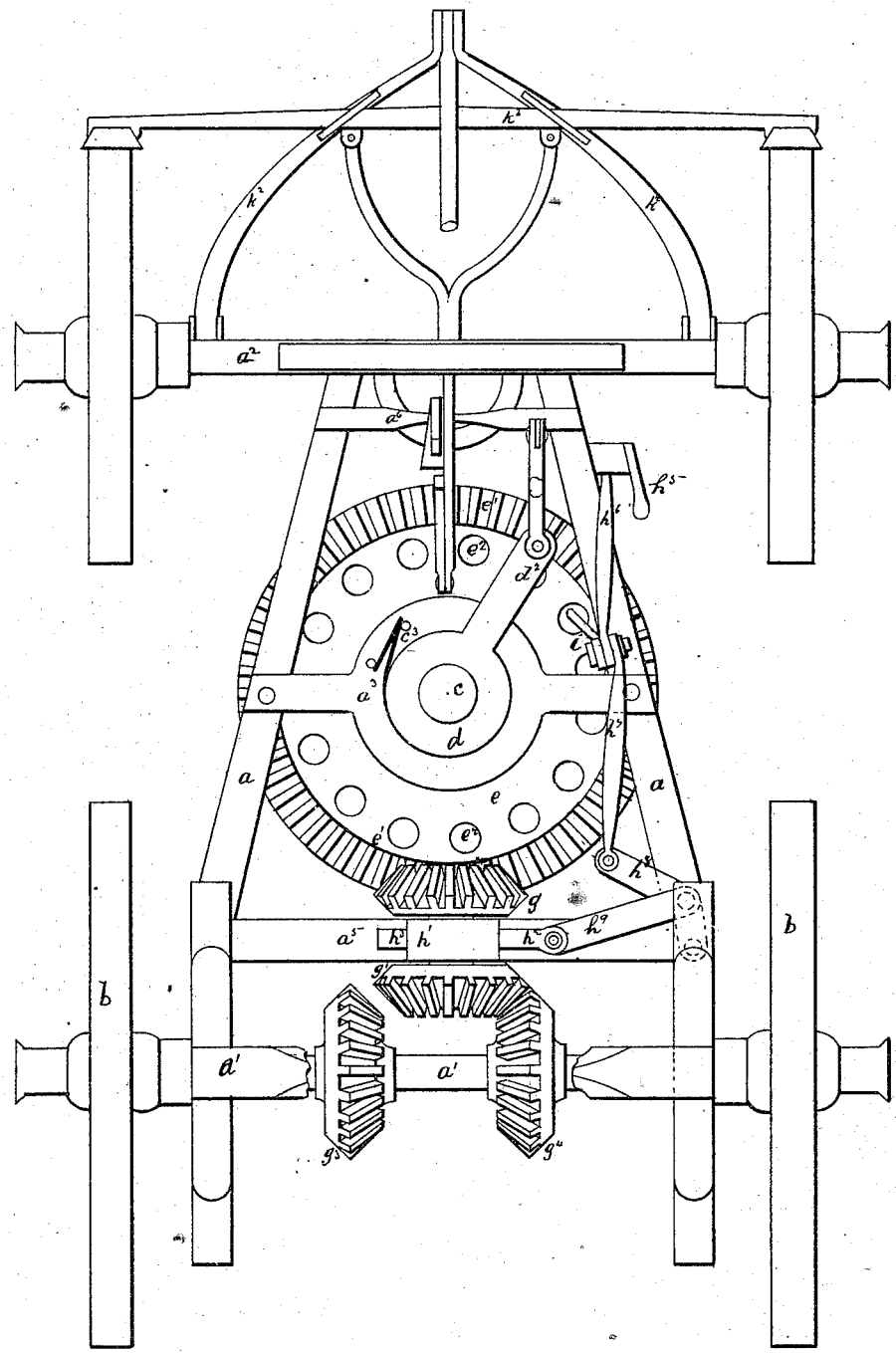
Figure 2:
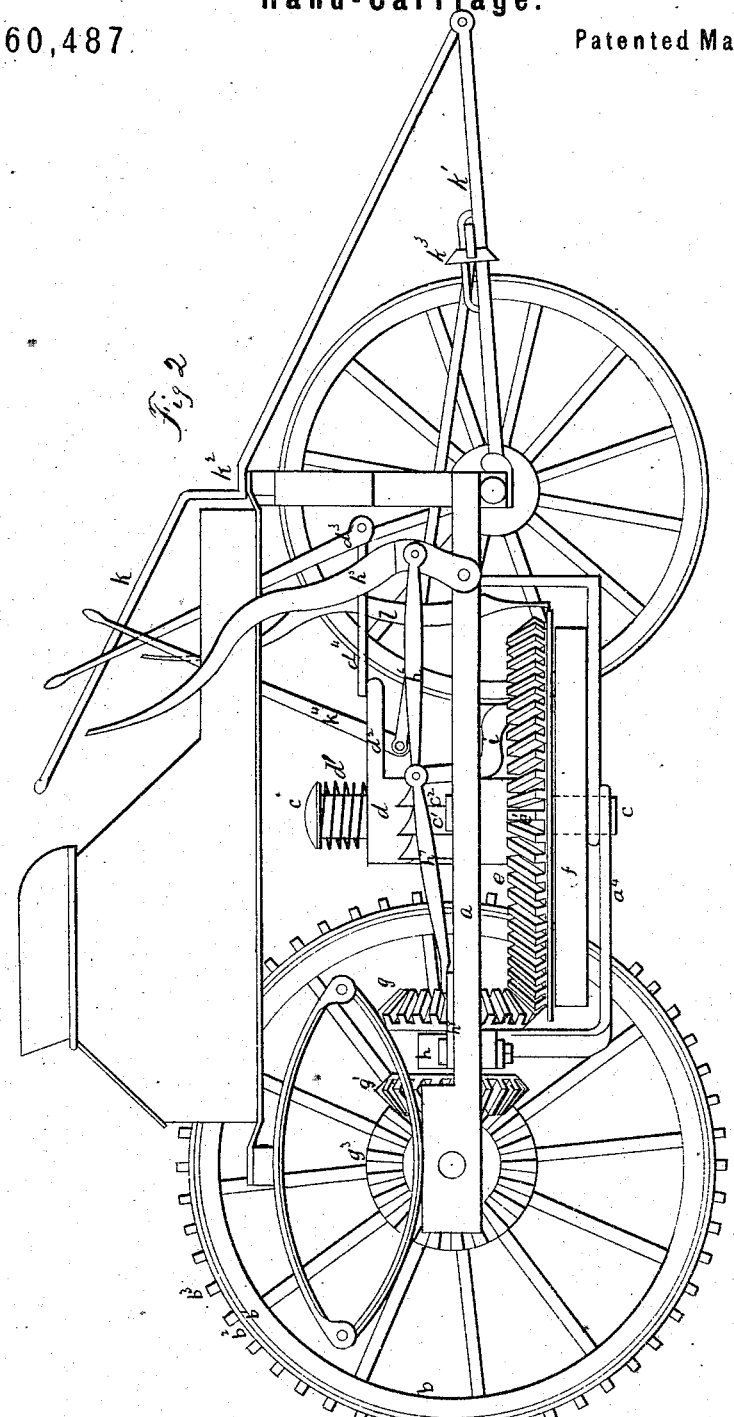

In the drawings, Figure 1 is a plan view with the bed removed, Fig. 2 a side elevation with wheels removed, Fig. 3 a plan view of the gearing connecting the driving-wheel and rear axle of the carriage, and Fig. 4 a side view of the sliding bearing.

$a\ a$ are the coupling-rods connecting the rear axle $a^1$ with front axle $a^2$. They are secured to front axle by a king-bolt, and to the rear axle by bearings which permit the free revolution of said axle. To these are secured the platform $a^3$, under yoke or hanging-frame $a^4$ and cross-bars $a^5\ a^6$, and other mechanism of my invention. $b\ b$ are the rear or driving wheels. They are firmly secured to the axle $a^1$ and bound by the inner tire $b^1$. $b^2$ is a removable tire placed over the tire $b^1$ and secured to the wheel by screw-bolts passing through from inner side of fellies. They are provided with the projections $b^3$ to increase friction. They may be removed or placed upon the wheel at pleasure, and are of special service in propelling the carriage in icy weather. $c$ is the main shaft. It is supported by and has its lower end journaled in the yoke $a^4$. It passes through the platform $a^3$, by which it is supported. It has secured to it the clutch $c^1$, which clutch has its outer side provided with the ratchet $c^2$, in which catches the pawl $c^3$. $d$ is an upper clutch or clutch-lever, which works in clutch $c^1$. It moves freely about the shaft $c$, and is held engaged with the lower clutch by the spring $d^1$. It has the arm $d^2$, which is connected with the lever $d^3$ by the link $d^4$. $e$ is the master-wheel, journaled to and revolving about shaft $c$. It is provided with the beveled cog-wheel $e^1$ and perforations $e^2$. $f$ is a strong coiled spring, arranged under the master-wheel. It has its inner end secured to shaft $c$ and its outer end secured to the master-wheel. It is wound up by means of clutches $c^2$ and $d$ and lever $d^3$. It is the power which drives the machinery in my invention. $g\ g^1$ are two beveled gears, connected by the short axle or wallower $g^2$. They are arranged to engage the master-wheel and the gears $g^3\ g^4$, secured to the axle $a^1$. The wheels $g^3\ g^4$ are arranged so that wheel $g^1$ will engage but one at a time. The axle $g^2$ is journaled in a bearing in a sliding block or pillow secured to the cross-bar $a^5$. $h$ is the sliding block or pillow, which supports, and in which bears, the axle $g^2$. It is held in place by the yoke $h^1$, which is made large enough to permit of sufficient lateral movement as to allow of the wheel $g^1$ to be put in gear either with wheel $g^3$ or $g^4$. It is furnished with the arms or extensions $h^2$ and $h^3$, which pass through suitable bearings in the ends of yoke $h^1$. It is also provided with tongues or bosses on its upper and under sides, which move in grooves made in the yoke $h^1$ and cross-bar $a^5$. These arms and tongues give steadiness to the movement of the sliding block. The block is operated by lever $h^5$, to which it connects by the links $h^6$, $h^7$, $h^8$, and $h^9$. It has the bearing $h^4$, in which is journaled the axle $g^2$. $i$ is a pawl-hook, attached to the links $h^6\ h^7$, and pivoted to the bar $a$, and so arranged that when the lever $h^5$ is thrown forward in the act of throwing the machinery out of gear, it will catch in the perforations of the master-wheel and lock said master-wheel, and prevent the spring from running down. $k$ is a lever for guiding the carriage. It extends to the hounds $k^1$, which it supports in a horizontal position. It is pivoted at $k^2$; by it the direction of the carriage may be changed as desired. $k^3$ is a brake secured to the hounds, and bearing on the front wheels. It is operated by the lever $k^4$. $l$ is a lever-brake for use in regulating the speed of the carriage. It is brought to bear on the master-wheel, and thus prevents it from being driven too rapidly by the spring.

It will be seen that the spring may be wound up while the carriage is in motion, and that by throwing the machinery out of gear with wheel $g^3$ and in gear with wheel $g^4$, the motion of the master-wheel will be reversed and the spring wound up. This latter movement is desirable in descending a hill where the carriage will run of its own weight.

Having described my invention, what I claim, and desire to secure by Letters Patent, is—

1. The coiled spring $f$, master-wheel $e$, shaft $c$, frame $a\, a^4$, platform $a^3$, clutch $c^1$, clutch-lever $d\, d^3$, ratchet $c^2$, and pawl $c^3$, combined to operate as and for the purposes specified.

2. The combination, with the master-wheel $e$, pinions $g\, g^1$, and frame $a\, a^5$, of the lever $h^5$, links $h^6\ h^7\ h^8\ h^9$, sliding bearing $h$, yoke $h^1$, and pawl $i$, as and for the purposes set forth.

In testimony that I claim the foregoing as my own I affix my signature in presence of two witnesses.

WILLIAM O. UMSTEAD.

Witnesses:
GEO. H. UMSTEAD,
ALFRED H. MITCHELL.